No. 848,472.

PATENTED MAR. 26, 1907.

F. W. LECHNER.
DEVICE FOR SMOOTHING WAGON ROADS.
APPLICATION FILED JUNE 30, 1906.

2 SHEETS—SHEET 1.

WITNESSES

INVENTOR
Frederick W. Lechner
BY Munn & Co
ATTORNEYS

No. 848,472.  
PATENTED MAR. 26, 1907.
F. W. LECHNER.  
DEVICE FOR SMOOTHING WAGON ROADS.  
APPLICATION FILED JUNE 30, 1906.
2 SHEETS—SHEET 2.
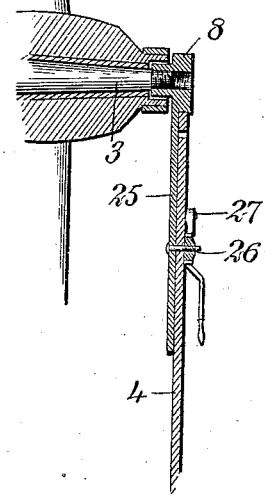
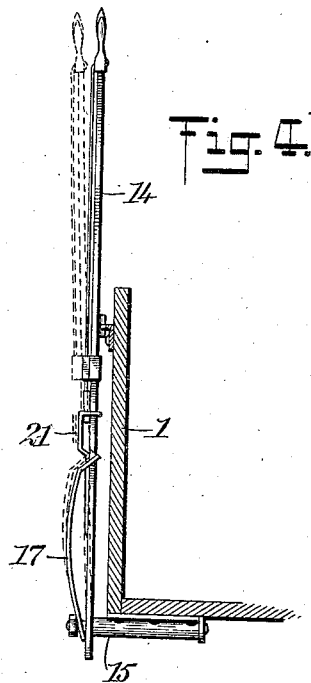
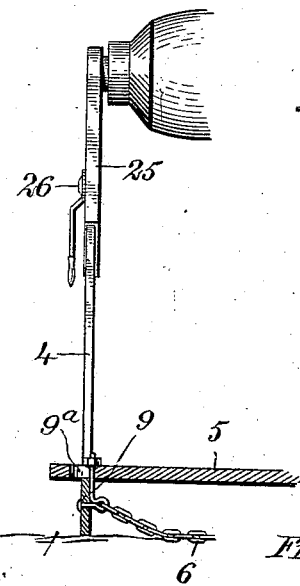
WITNESSES
INVENTOR  
Frederick W. Lechner  
BY  
ATTORNEYS
THE NORRIS PETERS CO., WASHINGTON, D. C.

UNITED STATES PATENT OFFICE.

FREDERICK W. LECHNER, OF WENONA, ILLINOIS.

DEVICE FOR SMOOTHING WAGON-ROADS.

No. 848,472.     Specification of Letters Patent.     Patented March 26, 1907.

Application filed June 30, 1906. Serial No. 324,186.

*To all whom it may concern:*

Be it known that I, FREDERICK W. LECHNER, a citizen of the United States, and a resident of Wenona, in the county of Marshall and State of Illinois, have invented a new and Improved Device for Smoothing Wagon-Roads, of which the following is a full, clear, and exact description.

This invention relates to a device adapted to be attached to any vehicle and used as a drag to smooth the road behind the said vehicle. It is a well-known fact that if roads are dragged with a harrow while soft they may be caused to dry up very much quicker, and in drying if the roads are repeatedly dragged deep ruts and grooves are avoided and a smooth hard surface is left when the ground becomes thoroughly dry.

The object of my invention is to provide an attachment which may be used only when desired and always be ready for use.

Reference is to be had to the accompanying drawings, which form part of this invention, in which drawings like characters of reference indicate corresponding parts in the several views, and in which—

Figure 1:
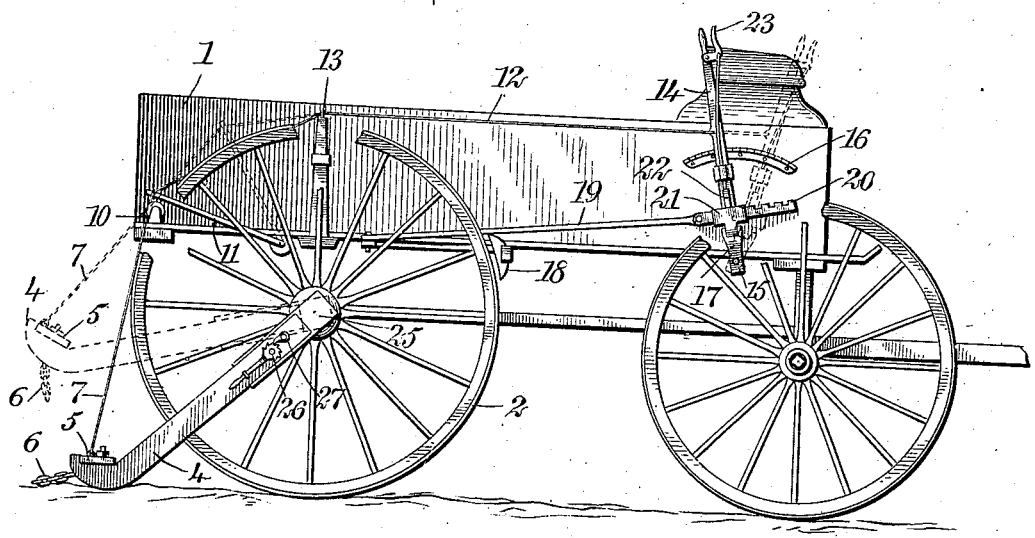
Figure 2:
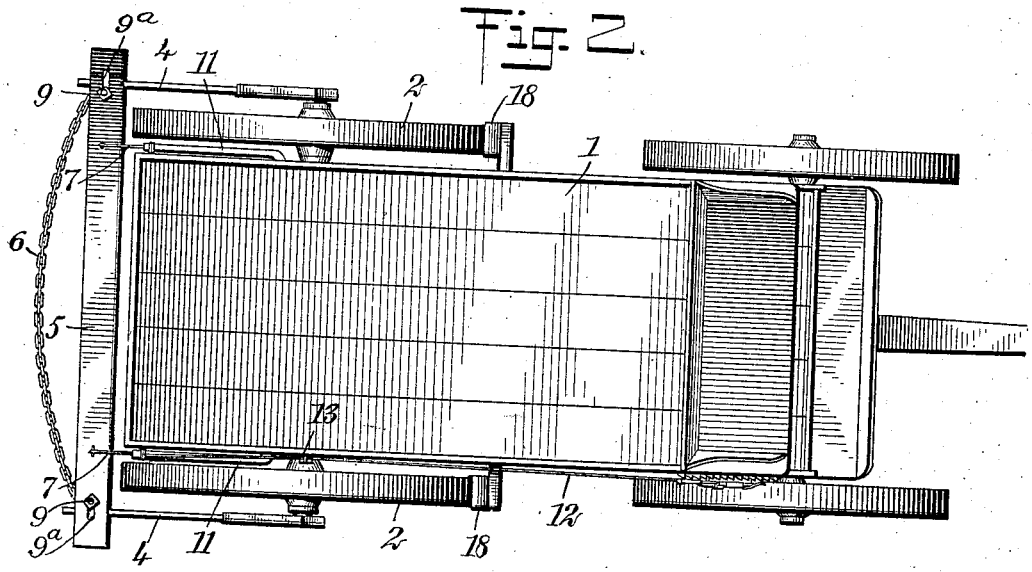

Figure 1 is a side elevation of a vehicle having my improved device attached thereto. Fig. 2 is a plan view of the same. Fig. 3 is a sectional elevation through the hub of the wheel and a portion of my device, illustrating the method of attaching the same. Fig. 4 is a side elevation of the operating mechanism and showing the wagon-body in section; and Fig. 5 is an elevation of a portion of the dragging means, a part thereof being shown in section.

In the form of the invention shown it is illustrated as being attached to a vehicle 1, having rear wheels 2 on an axle 3. Pivotally connected to the axle is my improved smoothing and dragging device, comprising arms 4, a flat connecting-beam 5, a chain 6, and a cord or wire 7 for raising or lowering the smoothing and dragging devices. For securing the arms 4 to the axle 3 I provide the end of each of the arms with a separable portion 25, secured thereto by means of a nut 26 and pawl 27. At the end of this part 25 is a collar 8, having a screw-threaded passage therethrough adapted to fit the end of the axle. The arms 4 are thus pivotally connected to the axle without in any way interfering with the motion of the wheel, and the collar 8 constitutes a nut to hold the wheel in place. When it is desired to oil the wheel or to remove the same for any other purpose, the nut 26 is removed and the two parts of the arm are separated, whereupon the part 25 constitutes a handle for turning the collar 8 and unscrewing the same.

Connecting the lower ends of the arms 4 is the beam 5 and the heavy chain 6. The beam 5 rests upon extensions of the arms 4, and bolts 9, to which ends of the chain 6 are connected, are passed through longitudinal slots 9ª in the beam 5, the bolts resting against the inner extremities of the slots, whereby the arms are prevented from coming together, the slots, however, allowing both vertical and lateral movement of the bolts, thereby preventing strains or binding when the vehicle passes over an obstruction.

For raising the device from the ground when it is no longer needed I provide two lifting-rods 7, connected to the beam 5 near the extremities thereof and riding upon pulleys 10 and secured at their upper ends to two arms 11. The arms 11 are secured to a shaft passing transversely beneath the bottom of the wagon-body and supported in suitable journals, whereby the shaft may be rotated and the two arms moved with it as on an axis. One of these arms 11 is connected, by means of a wire 12 passing through a suitable guide 13, to an operating-handle 14 near the driver's seat. This handle is pivotally supported on a pin 15 beneath the wagon-body and is provided with a lug adapted to fit in the notches of a curved body 16 on the side of the wagon-body. To hold the arm 14 in contact with the bar 16, I provide a spring 17, also connected with the pin 15 and bearing against the outer surface of the arm in a manner clearly illustrated in Fig. 4.

In using my improved device above described the beam and chain 6, constituting the dragging and smoothing mechanism, are normally held in the position shown in dotted lines in Fig. 1; but when the roads are soft and muddy and deep ruts are cut by the wheels I lower the smoothing and dragging means to the position shown in solid lines, and the driver then stands upon the beam 5 to increase the weight thereof and facilitate the smoothing action. Thus after the wagon has passed it will be found that by the combined action of the flat beam 5 and chain 6 the road is left in a smooth condition free from ruts. If all the wagons passing over any particular stretch of muddy road were provided with devices similar to that above described, it is very evident that by the time the road had become dry it would be in as fine a condition as possible, for at no time are ruts permitted to form, and the action of the chain 6 is to draw the dirt toward the center of the road, which would otherwise be washed away into the gutters. The beam 5 will not drag on level roads, as it rests on the upper edge of the arms 4, it being intended only to operate on a soft and rough ground, when the driver must stand thereon to make it effective. At other times it acts only as a spacing means to hold the arms 4 at the desired distance apart.

In connection with my improved smoothing and dragging device I may use a brake adapted to be operated by the same handle as is the smoothing and dragging device. This brake and operating mechanism comprises brake-shoes 18, operated by a draw-bar 19. This draw-bar has a hinged section 20, the upper side of which is provided with a plurality of notches and adapted to pass through a casing 21 on the side of the arm 14. The handle is also provided with a dog 22, operated by a small handle 23 and passing through an opening in the upper side of the casing 21. When it is desired to operate the brake, the handles 23 and 14 are gripped together, and the dog 22 is thus freed from contact with the draw-bar. The handle 14 may then be moved to any desired position and the dog 22 brought in contact with any one of the notches in the bar 20. Then by moving the handle 14 the brake may be operated without materially changing the position of the dragging and smoothing device. It will thus be seen that either may be operated entirely independently of the other, but both operated by the same handle.

Having thus described my invention, I claim as new and desire to secure by Letters Patent—

1. A vehicle having an axle, wheels mounted thereon, arms screw-threaded to the ends of the axle, a smoothing means connecting the ends of the arms, and means for raising and lowering the smoothing means.

2. A vehicle having an axle, an arm secured to the end of said axle, said arm comprising two sections detachably secured together, one of said sections having a collar screw-threaded to the end of the axle and adapted to hold the wheel in place.

3. A vehicle, arms each having one end pivotally connected to the wagon and the other adapted to rest on the ground, a platform connecting the lower ends of said arms, and supported thereon and means secured to the lower ends of the arms and adapted to drag on the ground behind said platform.

4. An improved road smoothing and dragging device, comprising arms each adapted to have one end pivotally connected to the end of the axle of a vehicle and hold the wheel thereon, and the lower ends of said arms rest on the ground, a platform or beam resting on the lower ends of said arm, means for securing the arms to the beam at varying distances apart, a chain also secured to the lower end of the arms and adapted to rest on the ground, and means for raising and lowering said device.

5. A vehicle having an axle, wheels mounted thereon, an arm secured to each end of said axle and adapted to rest upon the ground, a smoothing means connecting the ends of the arms and supported upon the upper sides thereof, and means for adjusting the distance between the ends of said arms upon which the smoothing means rests.

6. A vehicle, having an axle, wheels mounted thereon, arms secured to the ends of said axle and having their lower ends adapted to rest upon the ground, and a smoothing device connecting the lower ends of said arms, each of said arms comprising two members detachably secured together and one of said members being provided with a nut adapted to be screw-threaded to the end of the axle to hold the wheel in place, and the remainder of said member adapted to serve as a handle by which said nut may be turned.

In testimony whereof I have signed my name to this specification in the presence of two subscribing witnesses.

FREDERICK W. LECHNER.

Witnesses:
DORA KLIEBER,
J. P. L. KLIEBER.